US010962644B1

(12) United States Patent
Kong et al.

(10) Patent No.: US 10,962,644 B1
(45) Date of Patent: Mar. 30, 2021

(54) DYNAMIC LASER POWER CONTROL IN LIGHT DETECTION AND RANGING (LIDAR) SYSTEMS

(71) Applicant: BEIJING VOYAGER TECHNOLOGY CO., LTD., Beijing (CN)

(72) Inventors: Lingkai Kong, Mountain View, CA (US); Yue Lu, Los Gatos, CA (US); Youmin Wang, Mountain View, CA (US); Chao Wang, Mountain View, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/903,248

(22) Filed: Jun. 16, 2020

Related U.S. Application Data

(63) Continuation of application No. 16/653,969, filed on Oct. 15, 2019.

(51) Int. Cl.
*G01S 17/08* (2006.01)
*G01S 7/48* (2006.01)
*G01S 7/484* (2006.01)
*H01S 3/00* (2006.01)

(52) U.S. Cl.
CPC .............. *G01S 17/08* (2013.01); *G01S 7/484* (2013.01); *G01S 7/4808* (2013.01); *H01S 3/0085* (2013.01)

(58) Field of Classification Search
None
See application file for complete search history.

(56) References Cited

U.S. PATENT DOCUMENTS

| | | | | |
|---|---|---|---|---|
| 8,290,208 | B2* | 10/2012 | Kurtz | G06K 9/00228 382/103 |
| 9,201,501 | B2* | 12/2015 | Maizels | H04N 13/344 |
| 2004/0135992 | A1* | 7/2004 | Munro | G01S 17/10 356/4.01 |
| 2009/0273770 | A1* | 11/2009 | Bauhahn | G01C 3/08 356/5.01 |
| 2014/0104051 | A1* | 4/2014 | Breed | G01S 17/86 340/435 |
| 2018/0095168 | A1* | 4/2018 | Hofmann | G01S 17/89 |
| 2018/0113200 | A1* | 4/2018 | Steinberg | G05D 1/024 |
| 2018/0149748 | A1* | 5/2018 | Yang | G01S 7/4865 |

(Continued)

*Primary Examiner* — Eric L Bolda
(74) *Attorney, Agent, or Firm* — Bayes PLLC

(57) ABSTRACT

Embodiments of the disclosure provide a system for controlling power of laser lights emitted by an optical sensing device. The system includes at least one storage device configured to store instructions and at least one processor communicatively coupled to the at least one storage device and configured to execute the instructions to perform operations. The operations include detecting an object within a field of view of the optical sensing device based on a reflected laser signal received by the optical sensing device, determining a distance of the object from the optical sensing device, determining a value indicating a total power of one or more laser beams to be incident on an aperture at the distance, and comparing the value with a predetermined tolerance value. The operations also include adjusting a laser emission scheme to reduce the total power when the value is greater than the predetermined tolerance value.

19 Claims, 9 Drawing Sheets

(56) References Cited

U.S. PATENT DOCUMENTS

| | | | | |
|---|---|---|---|---|
| 2018/0284247 A1* | 10/2018 | Campbell | ............... | G01S 17/42 |
| 2019/0041523 A1* | 2/2019 | Muramatsu | ........... | G01S 7/4868 |
| 2019/0094346 A1* | 3/2019 | Dumoulin | ............... | G01S 17/42 |
| 2019/0213309 A1* | 7/2019 | Morestin | ............... | G01S 7/4808 |
| 2020/0116825 A1* | 4/2020 | Keller | .................. | G01S 7/484 |
| 2020/0217967 A1* | 7/2020 | Stoschek | ................ | G01S 17/10 |

* cited by examiner

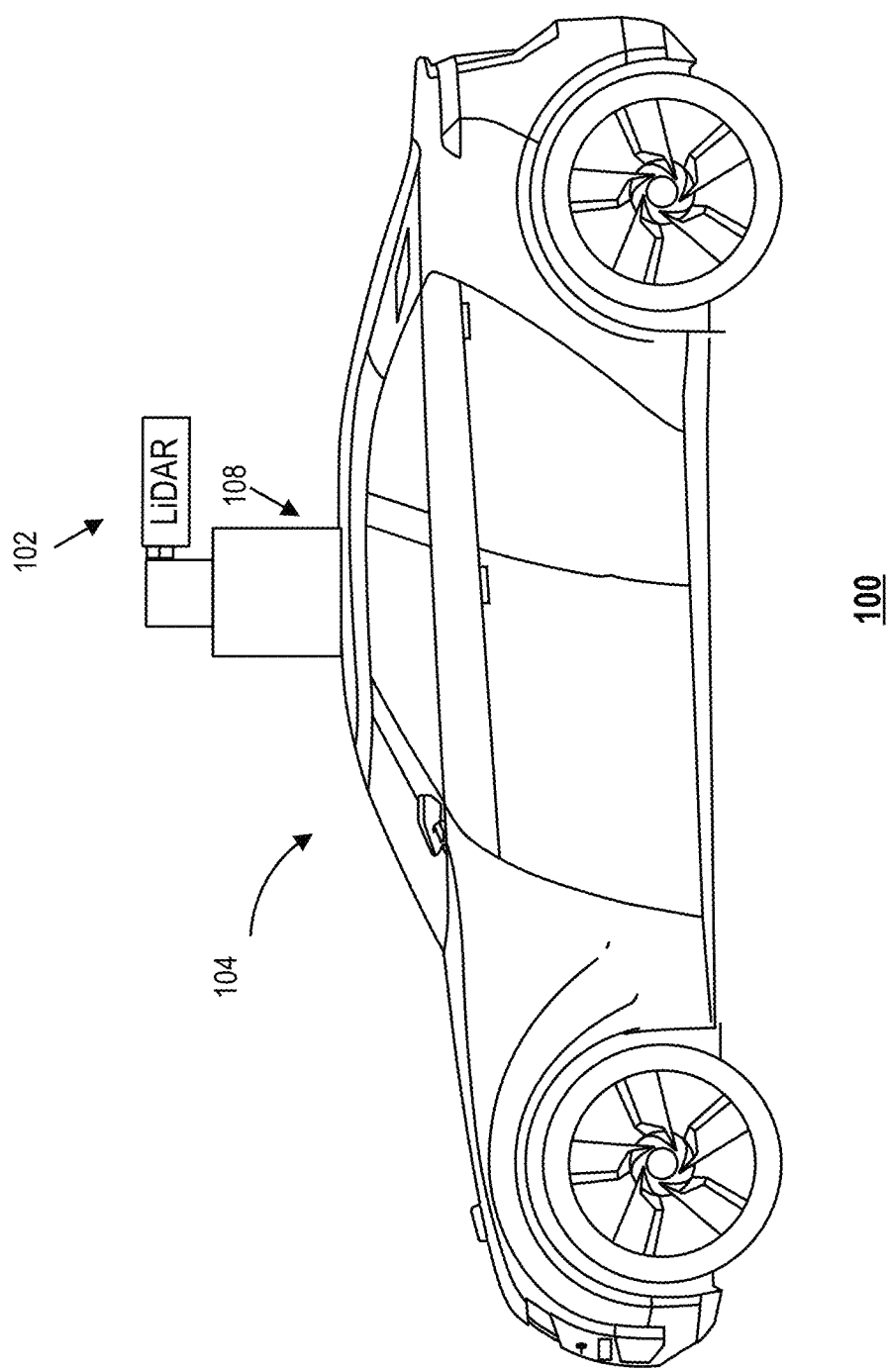

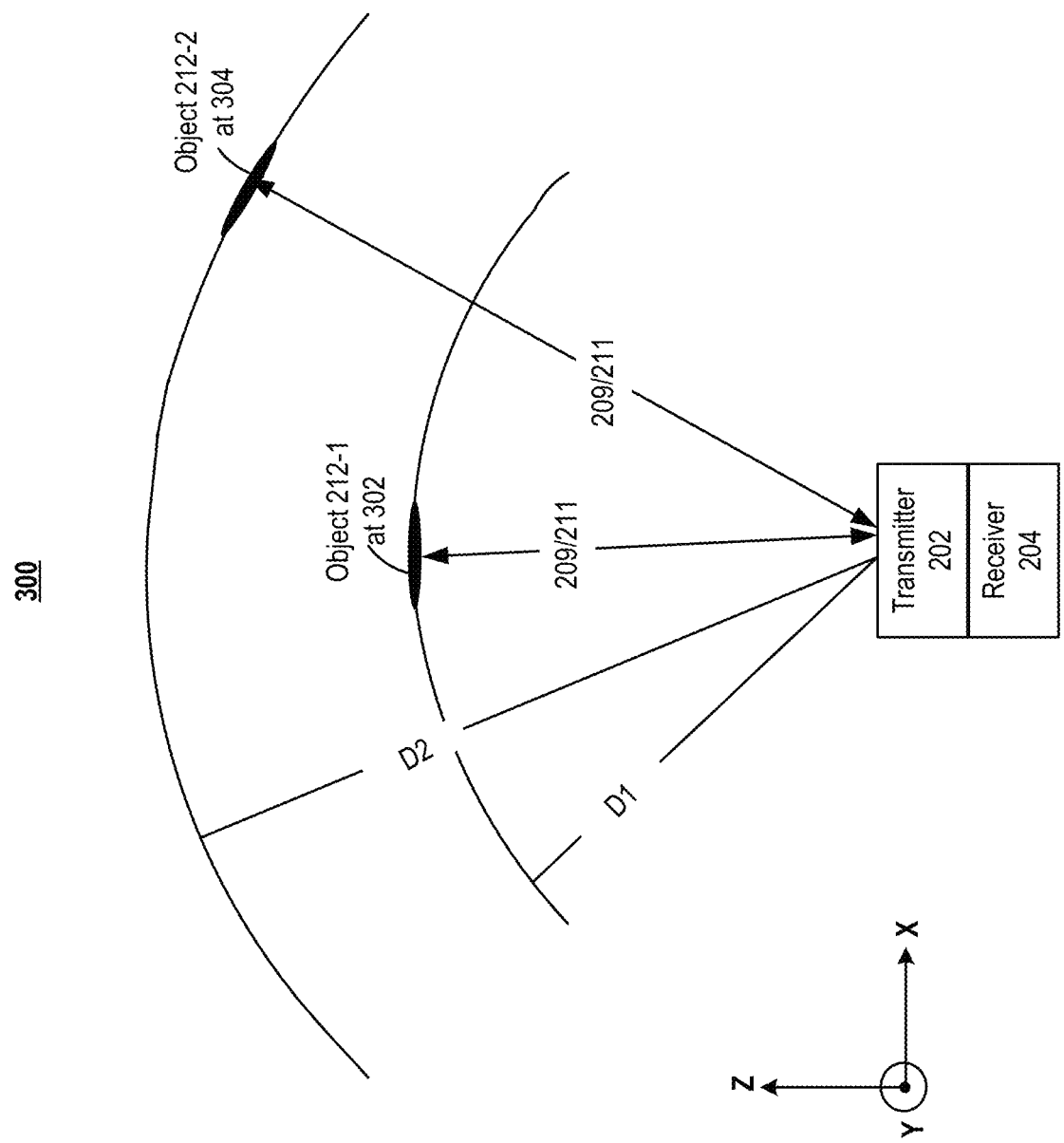

DYNAMIC LASER POWER CONTROL IN LIGHT DETECTION AND RANGING (LIDAR) SYSTEMS

CROSS-REFERENCE TO RELATED APPLICATION

This application is a continuation of U.S. patent application Ser. No. 16/653,969, filed Oct. 15, 2019, the entire contents of which are expressly incorporated herein by reference.

TECHNICAL FIELD

The present disclosure relates to Light Detection and Ranging (LiDAR) systems, and more particularly to, systems and methods for dynamic laser power control in the LiDAR systems.

BACKGROUND

Optical sensing systems such as LiDAR systems have been widely used in autonomous driving and producing high-definition maps. For example, a typical LiDAR system measures the distance to a target by illuminating the target with pulsed laser light beams and measuring the reflected pulses with a sensor such as a photodetector. Differences in laser light return times, wavelengths, and/or phases can then be used to construct digital three-dimensional (3D) representations of the target. Because using a narrow laser beam as the incident light can map physical features with very high resolution, a LiDAR system is particularly suitable for applications such as sensing in autonomous driving and/or high-definition map surveys.

A LiDAR system can use a transmitter to transmits a signal (e.g., pulsed laser light) into the surroundings, and use a receiver to collect the returned signal (e.g., laser light reflected by an object in the surroundings). The LiDAR system can then calculate parameters such as the distance between the object and the LiDAR system based on, e.g., the speed of light and the time the signal travels (e.g., the duration of time between the time the signal is transmitted and the time the returned signal is received) and use the parameters to construct 3D maps and/or models of the surroundings. To improve the detection range and the signal-to-noise-ratio (SNR), higher energy of the laser light is often needed. On the other hand, however, the energy of the signal also needs to be limited to avoid potential harm to human eye. Therefore, it is challenging to balance the performance demands and regulatory safety mandate in LiDAR system development.

Embodiments of the disclosure address the above challenges by systems and methods for dynamically controlling the laser power used in LiDAR systems.

SUMMARY

Embodiments of the disclosure provide a system for controlling power of laser lights emitted by an optical sensing device. The system may include at least one storage device configured to store instructions and at least one processor communicatively coupled to the at least one storage device and configured to execute the instructions to perform operations. The operations may include detecting an object within a field of view of the optical sensing device based on a reflected laser signal received by the optical sensing device, determining a distance of the object from the optical sensing device, determining a value indicating a total power of one or more laser beams to be incident on an aperture at the distance, and comparing the value with a predetermined tolerance value. The operations may also include adjusting a laser emission scheme to reduce the total power when the value is greater than the predetermined tolerance value.

Embodiments of the disclosure also provide a method for controlling power of laser lights emitted by an optical sensing device. The method may include detecting an object within a field of view of the optical sensing device based on a reflected laser signal received by the optical sensing device, determining a distance of the object from the optical sensing device, and determining a value indicating a total power of one or more laser beams to be incident on an aperture at the distance. The method may also include comparing the value with a predetermined tolerance value and adjusting a laser emission scheme to reduce the total power when the value is greater than the predetermined tolerance value.

Embodiments of the disclosure also provide a non-transitory computer-readable medium having instructions stored thereon. When executed by at least one processor, the instructions can cause the at least one processor to perform a method for controlling power of laser lights emitted by an optical sensing device. The method may include detecting an object within a field of view of the optical sensing device based on a reflected laser signal received by the optical sensing device, determining a distance of the object from the optical sensing device, and determining a value indicating a total power of one or more laser beams to be incident on an aperture at the distance. The method may also include comparing the value with a predetermined tolerance value and adjusting a laser emission scheme to reduce the total power when the value is greater than the predetermined tolerance value.

It is to be understood that both the foregoing general description and the following detailed description are exemplary and explanatory only and are not restrictive of the invention, as claimed.

BRIEF DESCRIPTION OF THE DRAWINGS

FIG. 1 illustrates a schematic diagram of an exemplary vehicle equipped with a LiDAR system, according to embodiments of the disclosure.

FIG. 3A illustrates detection of objects in a field of view of an exemplary LiDAR system, according to embodiments of the disclosure.

DETAILED DESCRIPTION

Figure 2A:
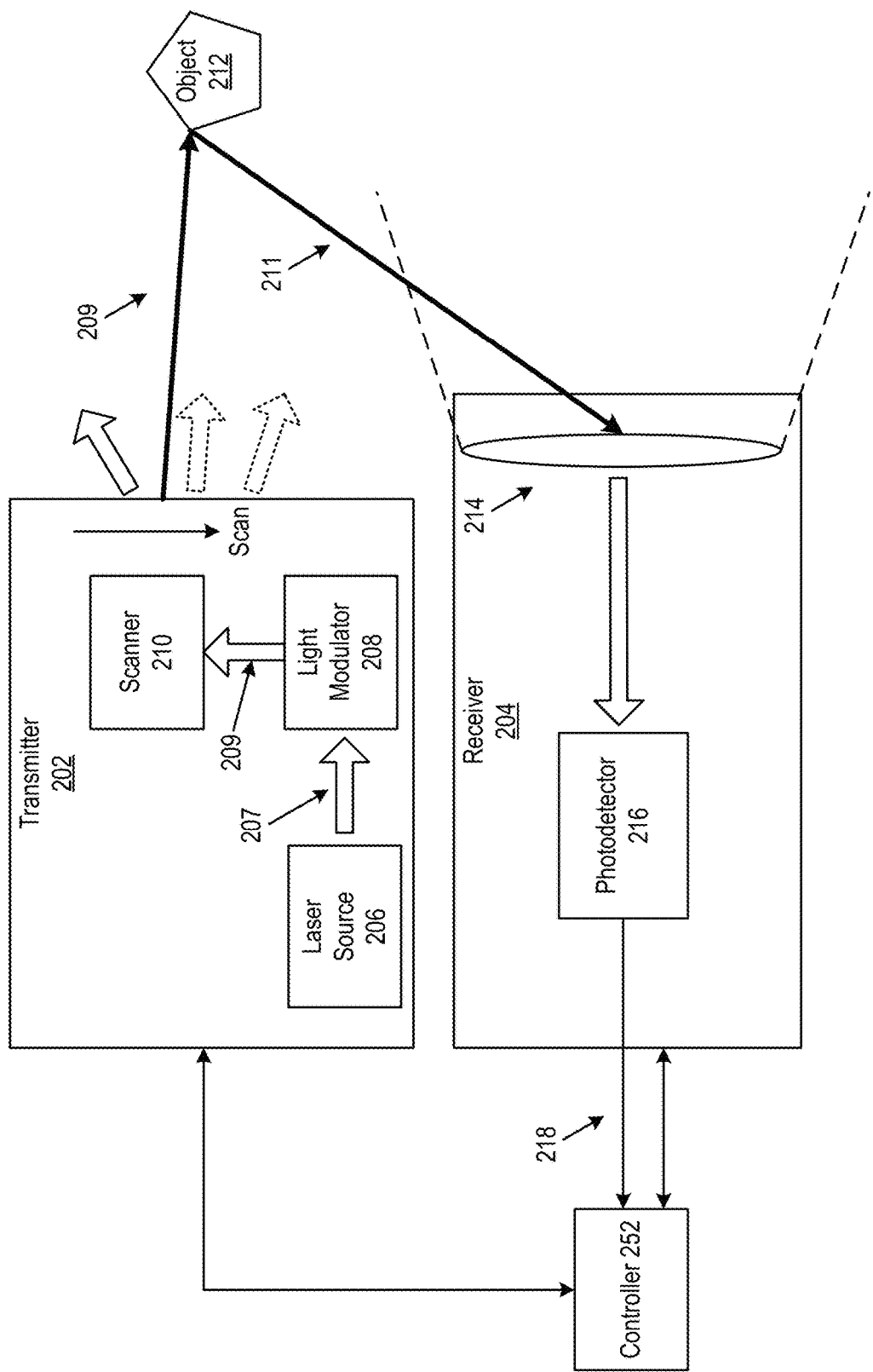
FIG. 2A illustrates a block diagram of an exemplary LiDAR system, according to embodiments of the disclosure.

Reference will now be made in detail to the exemplary embodiments, examples of which are illustrated in the accompanying drawings. Wherever possible, the same reference numbers will be used throughout the drawings to refer to the same or like parts.

FIG. 1 illustrates a schematic diagram of an exemplary vehicle 100 equipped with a LiDAR system 102, according to embodiments of the disclosure. As illustrated in FIG. 1, vehicle 100 may be equipped with LiDAR system 102 mounted to body 104 via a mounting structure 108. Mounting structure 108 may be an electro-mechanical device installed or otherwise attached to body 104 of vehicle 100. In some embodiments of the present disclosure, mounting structure 108 may use screws, adhesives, or another mounting mechanism. It is contemplated that the manners in which LiDAR system 102 can be equipped on vehicle 100 are not limited by the example shown in FIG. 1 and may be modified depending on the types of LiDAR system 102 and/or vehicle 100 to achieve desirable 3D sensing performance.

Consistent with some embodiments, LiDAR system 102 may be configured to capture data as vehicle 100 moves along a trajectory. For example, a transmitter of LiDAR system 102 is configured to scan the surrounding and acquire point clouds. LiDAR system 102 measures distance to a target by illuminating the target with pulsed laser light and measuring the reflected pulses with a receiver. The laser light used by LiDAR system 102 may be ultraviolet, visible, or near infrared. In some embodiments of the present disclosure, LiDAR system 102 may capture point clouds. As vehicle 100 moves along the trajectory, LiDAR system 102 may continuously emit/scan laser beams and receive returned laser beams.

Consistent with the present disclosure, a controller may be included for processing and/or analyzing collected data for various operations. For example, the controller may process received signals and control any operations based on the processed signals. The controller may also communicate with a remote computing device, such as a server (or any suitable cloud computing system) for operations of LiDAR system 102. Components of the controller may be in an integrated device or distributed at different locations but communicate with one another through a network. In some embodiments, the controller may be located entirely within LiDAR system 102. In some embodiments, one or more components of the controller may be located in LiDAR system 102, inside vehicle 100, or may be alternatively in a mobile device, in the cloud, or another remote location.

In some embodiments, the controller may process the received signal locally. In some alternative embodiments, the controller is connected to a server for processing the received signal. For example, the controller may stream the received signal to the server for data processing and receive the processed data (e.g., laser emission scheme(s) for controlling the laser power in an aperture) from the server. In some embodiments, the received signal is processed and the laser emission scheme(s) may be generated in real-time. A distance between the object and LiDAR system 102 may be updated in real-time for the determination of the laser emission scheme(s).

FIG. 2A illustrates a block diagram of an exemplary implementation of LiDAR system 102, according to embodiments of the disclosure. As shown in FIG. 2A, LiDAR system 102 has a transmitter 202 for emitting a laser beam 209 and a receiver 204 for collecting data that include a returned laser beam 211 reflected by an object 212. Transmitter 202 may include any suitable light source that emits laser beam 209 outwardly into the surroundings of LiDAR system 102. In some embodiments, laser beam 209 includes a pulsed laser signal with a scanning angle, as illustrated in FIG. 2A.

Transmitter 202 may include any suitable components for generating laser beam 209 of a desired wavelength and/or intensity. For example, transmitter 202 may include a laser source 206 that generates a native laser beam 207 in the ultraviolet, visible, or near infrared wavelength range. Transmitter 202 may also include a light modulator 208 that collimates native laser beam 207 to generate laser beam 209. Scanner 210 can scan laser beam 209 at a desired scanning angle and a desired scanning rate, Each laser beam 209 can form a scanning point on a surface facing transmitter 202 and at a distance from LiDAR system 102. Laser beam 209 may be incident on object 212, reflected back, and collected by a lens 214. Object 212 may be made of a wide range of materials including, for example, live objects, non-metallic objects, rocks, rain, chemical compounds, aerosols, clouds and even single molecules. The wavelength of laser beam 209 may vary based on the composition of object 212. In some embodiments of the present disclosure, scanner 210 may include optical components (lenses, mirrors) that can focus pulsed laser light into a narrow laser beam to increase the scan resolution.

Receiver 204 may be configured to detect returned laser beam 211 (e.g., returned signals) reflected from object 212. Upon contact, laser light can be reflected by object 212 via backscattering, such as Rayleigh scattering, Mie scattering, Raman scattering, and fluorescence. Receiver 204 can collect returned laser beam 211 and output electrical signal indicative of the intensity of returned laser beam 211. As illustrated in FIG. 2A, receiver 204 may include lens 214 and a photodetector (or photodetector array) 216. Lens 214 may be configured to collect light from a respective direction in its field of view (FOV).

Photodetector 216 may be configured to detect returned laser beam 211 reflected by object 212. Photodetector 216 may convert the laser light (e.g., returned laser beam 211) collected by lens 214 into a receiver signal 218 (e.g., a current or a voltage signal). Receiver signal 218 may be generated when photons are absorbed in photodiode 216. Receiver signal 218 may be transmitted to a data processing unit, e.g., controller 252 of LiDAR system 102, to be processed and analyzed. Controller 252 may be configured to control transmitter 202 and/or receiver 204 to perform detection/sensing operations.

Receiver signal 218 may include the power data (e.g., an electrical signal) of returned laser beam 211, e.g., converted from the light signal of returned laser beam 211. Returned laser beam 211 may be caused by the reflection of laser beam 209 from object 212 in the FOV of LiDAR system 102. As shown in FIG. 2A, scanner 210 may emit/scan laser beam 209 in various directions towards the surroundings. Laser beam 209 may be incident on object 212 to cause returned laser beam 211 to be formed and reflected back toward LiDAR system 102. Photodetector 216 may receive returned laser beam 211 through lens 214. Photodetector 216 may convert returned laser beam 211 into electrical signal 218, which is transmitted to controller 252. Controller 252 may further determine data and/or operations such as the distance of object 212 from LiDAR system 102 and subsequent laser emission scheme(s) of laser beam 209.

To obtain a desired coverage of the surroundings and/or the resolution of the scanning/sensing result, the power of laser beam 209 can be controlled/adjusted. For example, the power of laser beam 209 needs to be sufficiently high for LiDAR system 102 to detect object 212 from a desired distance. The span of the scanning angles of laser beam 209, e.g., in the three-dimensional (3D) space, also needs to be sufficiently large to cover a desired range of the surroundings laterally and vertically. Scanner 210 may scan laser beam 209 in the 3D space along a lateral scanning direction and a vertical scanning direction, e.g., from left to the right and from top to bottom, at a desired scanning rate.

Controller 252 may determine the distance of object 212 from LiDAR system 102 based on receiver signal 218 and data of laser beam 209. For example, the distance between object 212 and LiDAR system 102 may be calculated based on the speed of light, the scanning angle of laser beam 209, the round-trip travel time of laser beam 209/211 (e.g., from transmitter 202 to object 212 and back to receiver 204), and/or the power of returned laser beam 211 (e.g., the intensity of the light signal converted by photodetector 216 to receiver signal 218). Controller 252 may sense object 212 and adjust the laser emission scheme of laser beam 209 when the distance between object 212 and LiDAR system 102 is equal to or less than a distance tolerance value (e.g., a distance at which unadjusted laser beam 209 in subsequent emissions would cause potential harm when object 212 is a human being or possesses safety concerns). For example, to reduce or avoid the potential harm to human eyes, the laser emission scheme, after the adjustment, can cause the total power incident on an area representative of the size of a human pupil at the distance to be lower than a safety limit. In some embodiments, the adjustment of laser emission scheme is performed in real-time or near real-time. For example, if the distance between object 212 and LiDAR system 102 changes, controller 252 may dynamically adjust the laser emission scheme to ensure the total power incident on the area at the changed distance is less than the safety limit. For example, if the distance decreases, controller 252 may adjust the laser emission scheme so that the total power to be incident on the area does not exceed the safety limit. Functions of controller 252 for the determination of the distance or other triggers related to the potential harm and the adjustment of laser emission scheme of laser beam 209 are described in greater detail in connection with FIG. 2B.

Figure 2B:
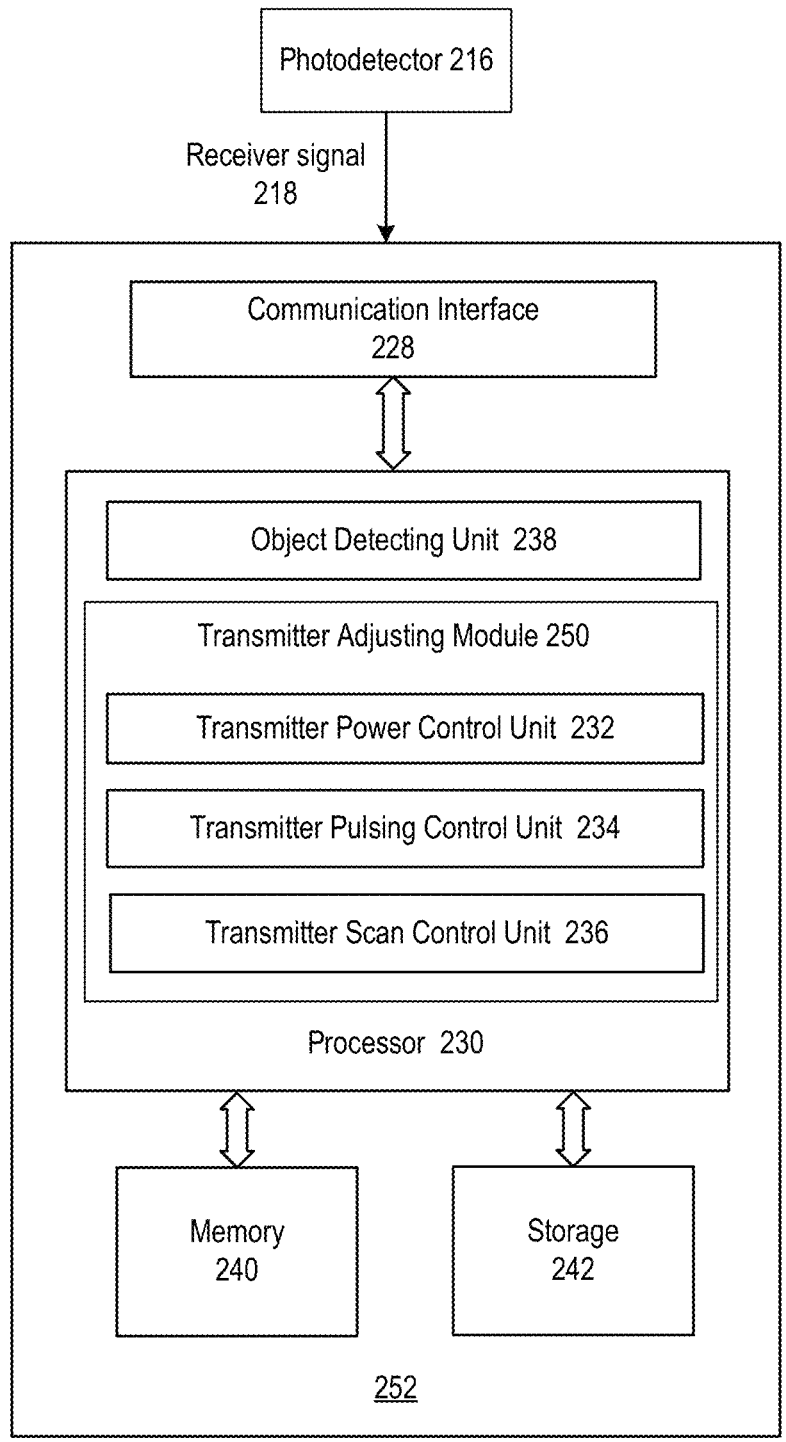
FIG. 2B illustrates a block diagram of an exemplary controller for controlling laser power in a LiDAR system, according to embodiments of the disclosure.

FIG. 2B shows an exemplary implementation of controller 252, according to embodiments of the disclosure. Consistent with the present disclosure, controller 252 may receive receiver signal 218 (e.g., containing power data of returned laser beam 211) from photodetector 216.

In some embodiments, as shown in FIG. 2B, controller 252 may include a communication interface 228, a processor 230, a memory 240, and a storage 242. In some embodiments, controller 252 may have different modules in a single device, such as an integrated circuit (IC) chip (implemented as, for example, an application-specific integrated circuit (ASIC) or a field-programmable gate array (FPGA)), or separate devices with dedicated functions. In some embodiments, one or more components of controller 252 may be located in a cloud, or may be alternatively in a single location (such as inside vehicle 100 or a mobile device) or distributed locations. Components of controller 252 may be in an integrated device, or distributed at different locations but communicate with each other through a network.

Communication interface 228 may send data to and receive data from components such as photodetector 216 via communication cables, a Wireless Local Area Network (WLAN), a Wide Area Network (WAN), wireless communication links such as radio waves, a cellular network, and/or a local or short-range wireless network (e.g., Bluetooth™), or other communication methods. In some embodiments, communication interface 228 can be an integrated services digital network (ISDN) card, cable modem, satellite modem, or a modem to provide a data communication connection. As another example, communication interface 228 can be a local area network (LAN) card to provide a data communication connection to a compatible LAN. Wireless links can also be implemented by communication interface 228. In such an implementation, communication interface 228 can send and receive electrical, electromagnetic or optical signals that carry digital data streams representing various types of information.

Consistent with some embodiments, communication interface 228 may receive receiver signal 218 (e.g., containing data of returned laser beam 211). In some embodiments, communication interface 228 may sequentially receive receiver signals 218 as scanner 210 continues to scan laser beams 209 at the scanning rate. Communication interface 228 may transmit the received receiver signal 218 to processor 230 for processing.

Processor 230 may include any appropriate type of general-purpose or special-purpose microprocessor, digital signal processor, or microcontroller. Processor 230 may be configured as a stand-alone processor module dedicated to analyzing signals (e.g., receiver signal 218) and/or controlling the scan schemes. Alternatively, processor 230 may be configured as a shared processor module for performing other functions unrelated to signal analysis/scan scheme control.

In many LiDAR systems with laser wavelengths between 800 nm and 900 nm, or shorter than 1400 nm, laser energy is strictly regulated due to its potential damage to human eyes. Traditionally, the energy of each laser pulse is set to be within the regulation/safety limit, based on the assumption or worst case scenario that all pulses emitted towards a 7 mm pupil-size aperture is absorbed by the aperture. For high resolution and long-range LiDAR systems, this becomes a fundamental challenge. First, high resolution LiDAR may transmit more pulses with small spatial step size, which means 10 or more pulses would be inside the 7 mm pupil area at close distance, forcing each pulse to be lower energy. Also, long distance LiDAR requires high energy pulses, which is difficult or even impossible to achieve with the power limit set by the regulation.

The present disclosure provides systems and methods for dynamically reducing the scanning energy at an object when the object is in a short distance from the LiDAR system. The LiDAR system (e.g., via the controller) may adjust the laser emission scheme dynamically as the distance changes to ensure the total laser power to be incident on a pupil-size aperture, which represents a human pupil, does not exceed a predetermined tolerance value. The human pupil is thus less susceptible to harm caused by the LiDAR system. Details of the embodiments are described in greater detail as follows.

As shown in FIG. 2B, processor 230 may include multiple functional units or modules that can be implemented using software, hardware, middleware, firmware, or any combination thereof. For example, processor 230 may include an object detecting unit 238, a transmitter adjusting module 250, or the like. In some embodiments, transmitter adjusting module 250 includes a transmitter power control unit 232, a transmitter pulsing control unit 234, and a transmitter scan control unit 236. In some embodiments, processor 230 compares a total power of laser beam 209 to be incident on object 212, e.g., in a pupil-sized aperture, with a predetermined tolerance value. The predetermined tolerance value may be equal to or be correlated with the safety limit, over which potential harm can be caused to human eyes by laser beam 209. Processor 230 may also adjust the laser emission scheme so that the total power of laser beam 209 in the aperture does not exceed the predetermined tolerance value. Thus, if object 212 is indeed a human being, the human eyes are less susceptible to harm caused by laser beam 209.

Object detecting unit 238 may determine whether object 212 is subjected to potential harm by laser beam 209 and send an alert signal to transmitter adjusting module 250 after determining that object 212 is subjected to potential harm. Transmitter adjusting module 250 may adjust the laser emission scheme accordingly. In some embodiments, object detecting unit 238 also sends to transmitter adjusting module 250 any data that can be used for the adjustment of laser emission scheme, such as the distance between object 212 and LiDAR system 102. In some embodiments, object detecting unit 238 determines object 212 is in the FOV of LiDAR system 102 based on receiver signal 218. Object detecting unit 238 may determine the distance between object 212 and LiDAR system 102 based on, e.g., the round-trip travel time of laser beams 209 and 211 and the scanning angle of scanner 210.

Object detecting unit 238 may compare, e.g., in real-time, the distance between LiDAR system 102 and object 212 with a distance tolerance value. For example, when the distance between LiDAR system 102 and object 212 is greater than the distance tolerance value, it may be determined that no harm can be caused by laser beam 209. On the other hand, when object detecting unit 238 determines that the distance between LiDAR system 102 and object 212 is equal to or less than the distance tolerance value, object detecting unit 238 may send an alert signal to transmitter adjusting module 250. The distance tolerance value may be a suitable value that is determined based on, for example, the maximal or rated power of laser beam 209, the spatial steps of the scanning angles, the density of the scanning angles, the number of pulses per scanning angle, and/or the safety limit imposed by the relevant regulations to protect human eyes.

After receiving the alert signal, the distance between object 212 and LiDAR system 102, and/or other relevant data, transmitter adjusting module 250 may further determine a value indicating the total power to be incident on an aperture (e.g., a pupil-sized aperture) at the distance in subsequent laser emissions if a current laser emission scheme remains unchanged. Based on the value, transmitter adjusting module 250 may adjust the laser emission scheme so that the total laser power to be incident on the aperture in subsequent laser emissions does not exceed the predetermined tolerance value with the adjusted laser emission scheme. The value indicating the total laser power to be incident on the aperture can be determined in various ways. In some embodiments, transmitter adjusting module 250 may determine the value based on the number of scanning points covered by the aperture at the distance. In some embodiments, transmitter adjusting module 250 may determine the value based on a density of the scanning points at the distance. In some embodiments, transmitter adjusting module 250 may determine the value based on a size of a scanning point at the distance. In some embodiments, the value may include the total power of laser beam 209 incident to the aperture, which can be calculated based on any suitable combinations of the above-mentioned quantities or similar data. In some embodiments, transmitter adjusting module 250 may incorporate suitable existing data (e.g., stored in memory 240 and/or storage 242) of laser beam 209 for the calculation of total power of laser beam 209. For example, transmitter adjusting module 250 may employ data of scanning rate, scanning angle, angle between adjacent laser beams 209, and/or power of laser beam 209 (e.g., a single laser beam 209) for the calculation of the total power. In some embodiments, instead of calculating the total power, transmitter adjusting module 250 may instead use any of the number of scanning points covered by the aperture at the distance, the density of the scanning points at the distance, or the size of the scanning point at the distance as indicator(s) (e.g., the value) of the total power, and may determine whether the total power exceeds the predetermined tolerance value based on the indicator(s). For example, a look-up table can be used to map the relationship between the indicator(s) and the corresponding indicator(s) that represent the predetermined tolerance value. In another example, instead of or in addition to using a look-up table, the relationship can also be calculated in a dynamic or on-demand manner. In some embodiments, one or more operations, or portions thereof, described above as being performed by transmitter adjusting module 250 may be performed by object detecting unit 238.

After determining the value indicating the total power of laser beam 209, transmitter adjusting module 250 may compare the value with a predetermined tolerance value, which can be based on the safety limit of laser power that can be incident on a human pupil. For example, the predetermined tolerance value may be represented as a power value indicating the maximal total power of laser light that can be incident on a human pupil without causing harm. In another example, the predetermined tolerance value may be represented as the maximal number of scanning points that fall with a pupil-size aperture at a particular distance for the kind of laser beam used for scanning. In a further example, the predetermined tolerance value may be represented as a density level at a particular distance. In yet a further example, the predetermined tolerance value may be represented as a size of the scanning point at a particular distance. The predetermined tolerance value may also be represented using other indicators indicating the maximal total power of laser light that can be incident on a human pupil without causing harm. In some embodiments, comparison between the value and the predetermined tolerance value may be performed by object detecting unit 238.

Transmitter adjusting module 250 may adjust the laser emission scheme for emitting subsequent laser beams based on the comparison between the value indicating the total power and the predetermined tolerance value. As used here, a laser emission scheme may include the manner of scanning, such as skipping one or more scanning angles and adjusting the order, sequence, and/or pattern of scanning. The laser emission scheme may also include adjusting the power of the laser beam, such as reducing the power of a laser beam to be emitted along a particular angle, reducing the power of one or more pulses of a multi-pulse laser beam, or skipping one or more pulses of a multi-pulse laser beam.

In some embodiments, when the comparison result indicates that the total power incident on the pupil-size aperture at the distance is greater than the safety limit, transmitter adjusting module 250 may adjust the laser emission scheme to reduce the total power to a level below the safety limit. In various embodiments, the adjustment can include one or more methods. In some embodiments, transmitter power control unit 232 reduces the power (e.g., peak power or intensity) of laser beam 209 at one or more scanning angles such that the total power carried by the scanning points covered by the aperture reduces. In some embodiments, transmitter pulsing control unit 234 reduces the number of pulses at a scanning point, e.g., in a multi-pulse ranging operation. In some embodiments, transmitter scan control unit 236 reduces the number of scanning points, e.g., skipping laser beams 209 at one or more scanning angles such that the number of scanning points covered by the aperture reduces.

Units 232-238 (and any corresponding sub-modules or sub-units) and module 250 can be hardware units (e.g., portions of an integrated circuit) of processor 230 designed for operation independently or with other components or software units implemented by processor 230 through executing at least part of a program. The program may be stored on a computer-readable medium. When the program is executed by processor 230, the executed program may cause processor 230 to perform one or more functions or operations. Although FIG. 2B shows units 232-238 all within one processor 230, it is contemplated that these units may be distributed among multiple processors located close to or remotely with each other. The functions of units 232-238 and module 250 are described in greater detail as follows in connection with FIGS. 3A-3D, 4A-4B, and 5.

Memory 240 and storage 242 may include any appropriate type of mass storage provided to store any type of information that processor 230 may need to operate. Memory 240 and/or storage 242 may be volatile or non-volatile, magnetic, semiconductor-based, tape-based, optical, removable, non-removable, or other type of storage device or tangible (i.e., non-transitory) computer-readable medium including, but not limited to, a ROM, a flash memory, a dynamic RAM, a static RAM, a hard disk, an SSD, an optical disk, etc. Memory 240 and/or storage 242 may be configured to store one or more computer programs that may be executed by processor 230 to perform functions disclosed herein. For example, memory 240 and/or storage 242 may be configured to store program(s) that may be executed by processor 230 to analyze LiDAR signals and control the scanning schemes of laser beams.

Memory 240 and/or storage 242 may be further configured to store/cache information and data received and/or used by processor 230. For instance, memory 240 and/or storage 242 may be configured to store/cache receiver signal 218, data of laser beam 209, predetermined tolerance value(s), look-up tables storing mapping relationship between values indicating the total power incident to a pupil-size aperture at various distances and the corresponding tolerance values indicating the safety limits, and calculation results obtained by different units of processor 230. The various types of data may be stored permanently, removed periodically, or disregarded immediately after each frame of data is processed.

Figure 3C:
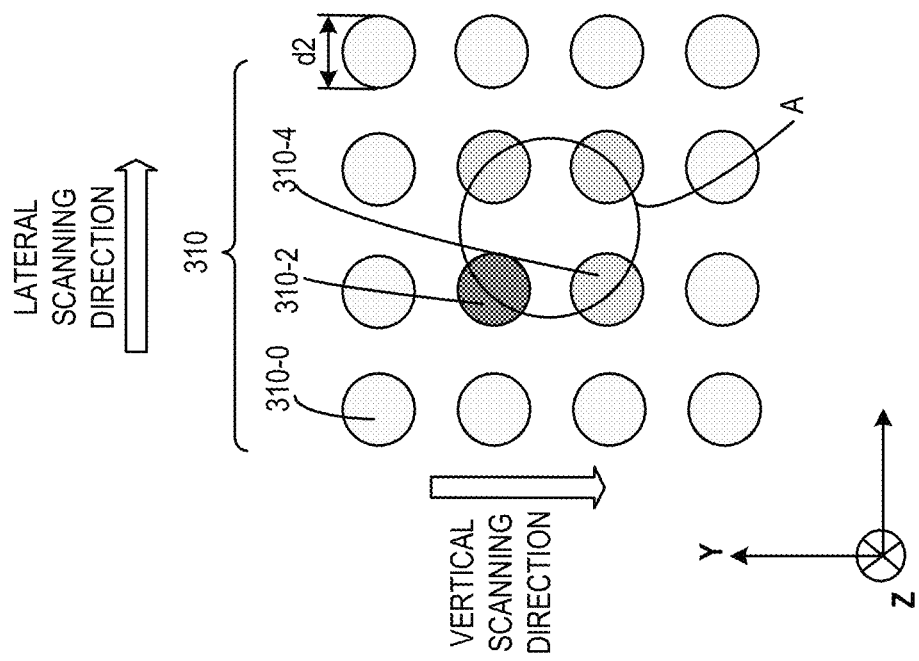
FIGS. 3B-3D each illustrates an exemplary laser emission scheme, according to embodiments of the disclosure.
Figure 3B:
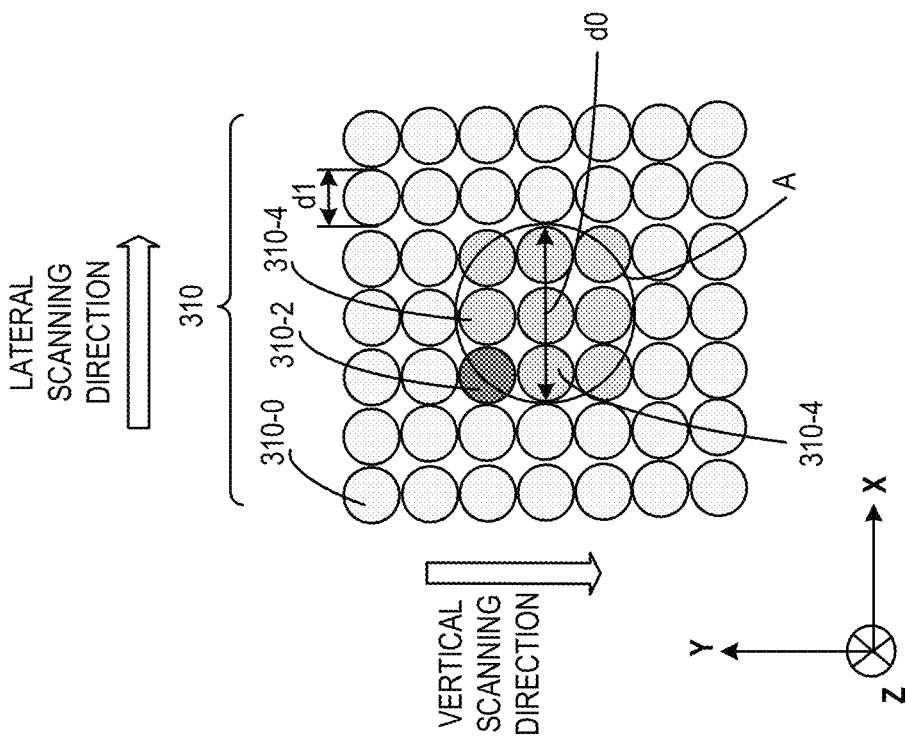
Figure 3D:
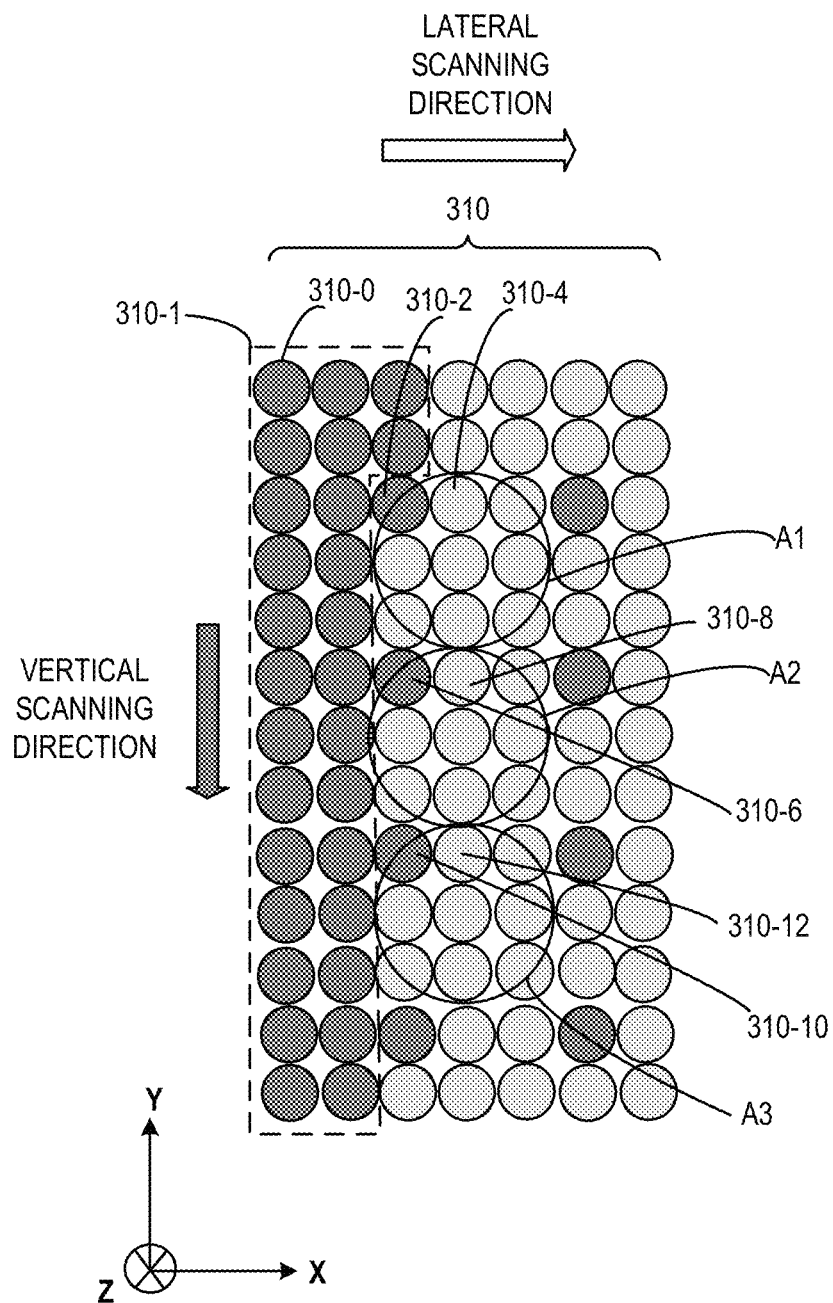
Figure 4A:
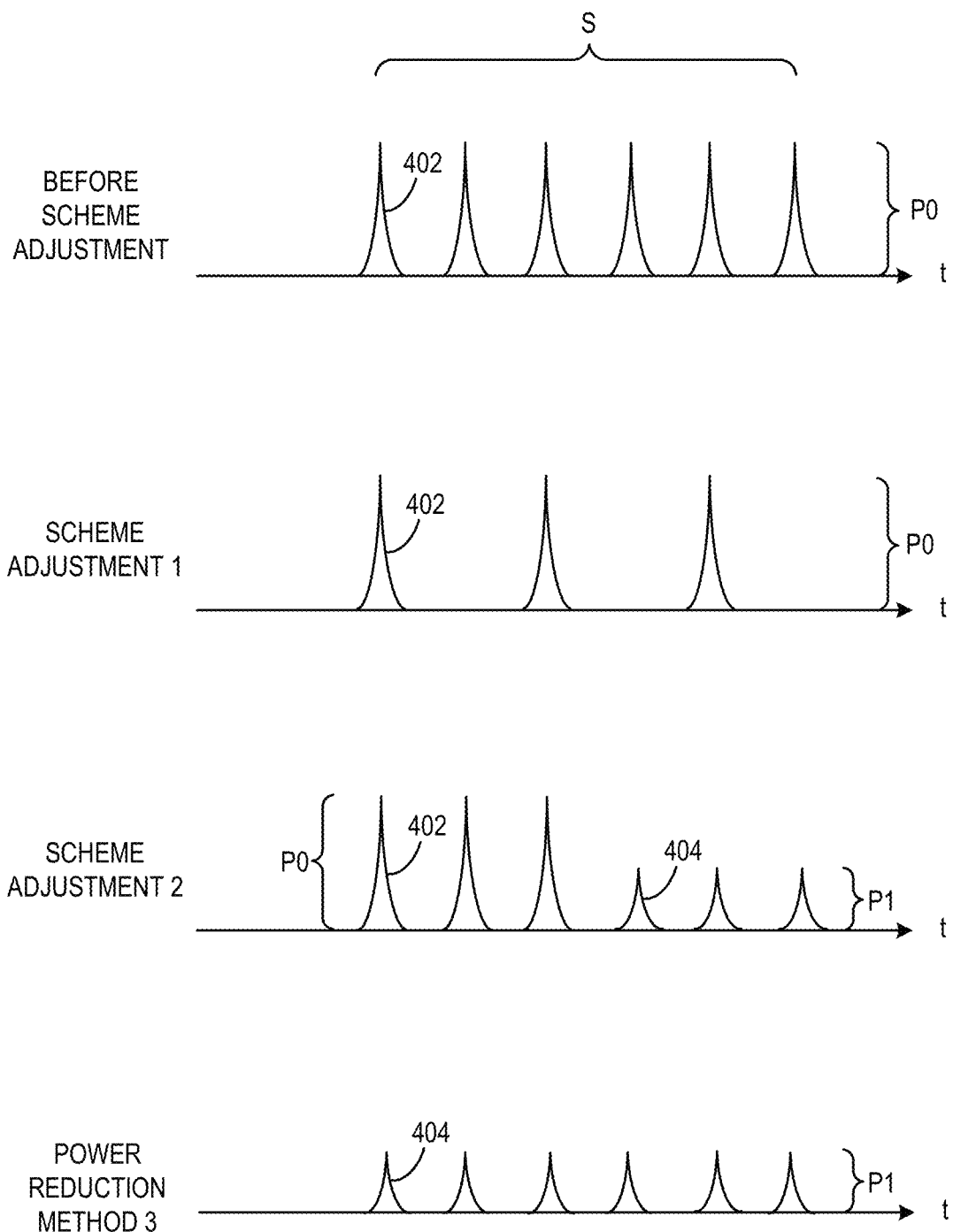
FIGS. 4A and 4B illustrate a plurality of exemplary laser emission schemes in multi-pulse ranging operations, according to embodiments of the disclosure.
Figure 4B:
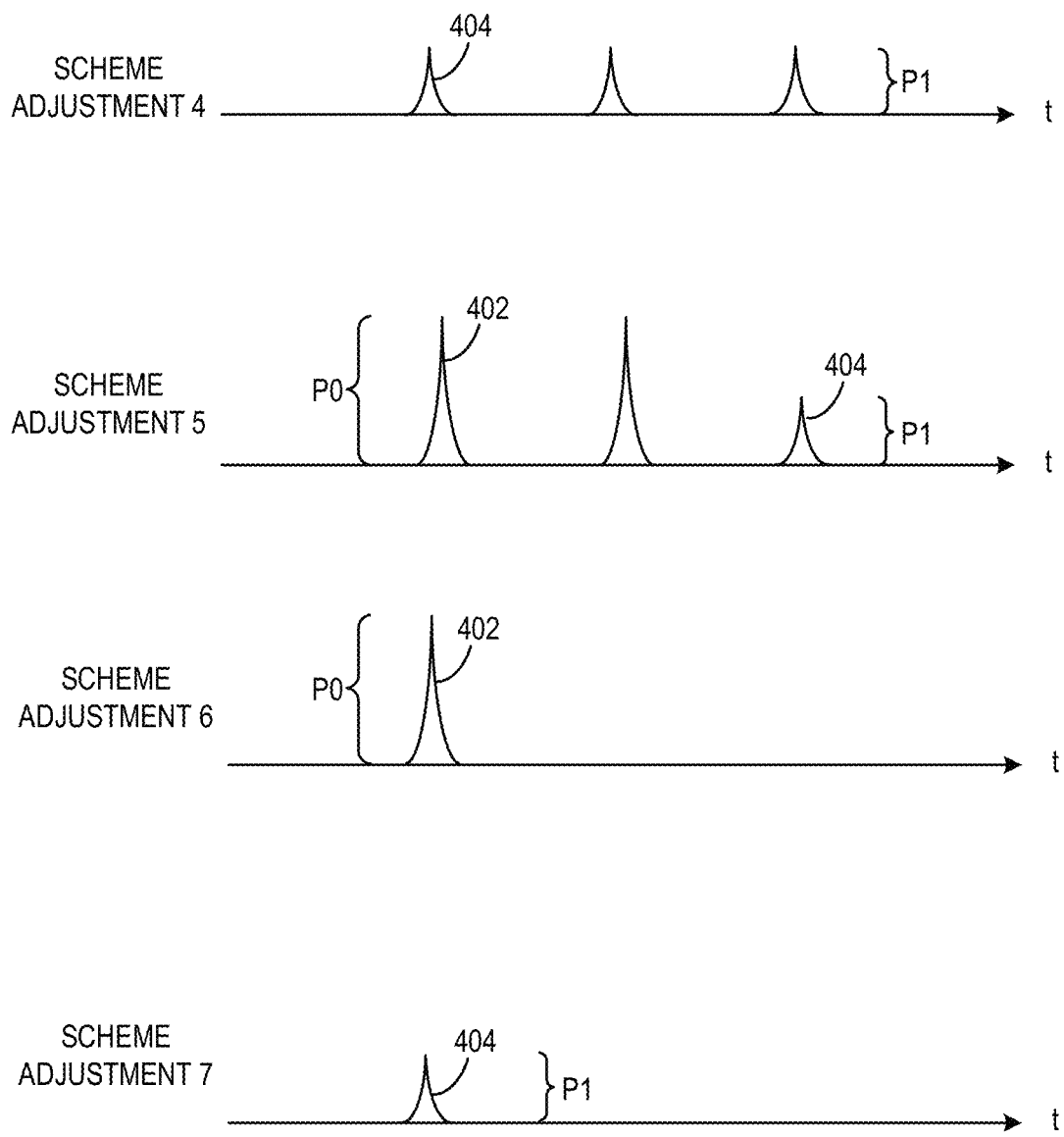
Figure 5:
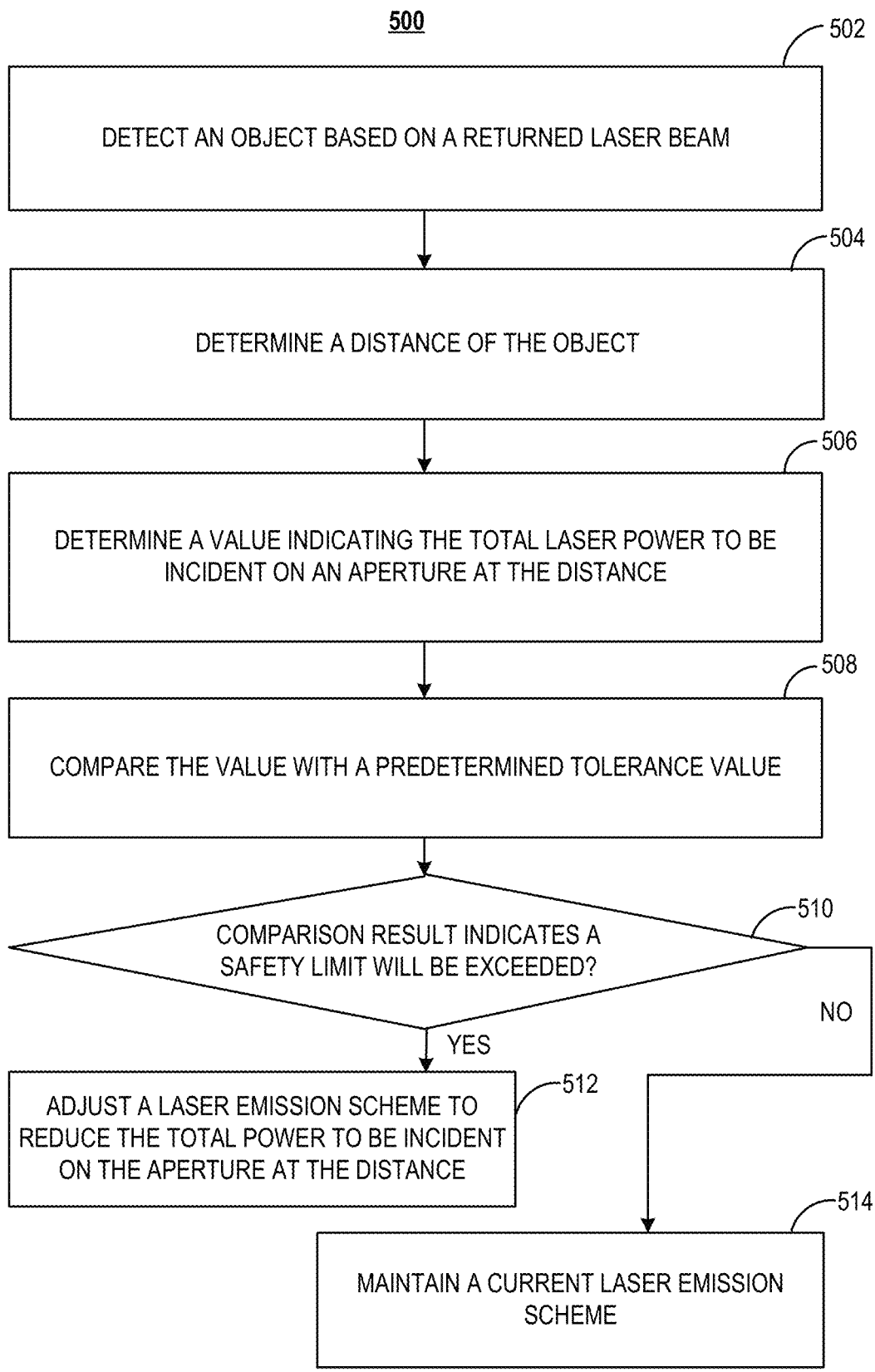
FIG. 5 illustrates a flowchart of an exemplary method to control laser power in a LiDAR system, according to embodiments of the disclosure.

FIG. 3A illustrates an exemplary FOV 300 of LiDAR system 102, according to embodiments of the present disclosure. FIG. 3B illustrates an exemplary laser emission scheme 352 at a location 302 of FOV 300, according to embodiments of the present disclosure. FIG. 3C illustrates an exemplary laser emission scheme 354 at a location 304 of FOV 300, according to embodiments of the present disclosure. FIG. 3D illustrates an expanded version of laser emission scheme 352 shown in FIG. 3B, according to embodiments of the present disclosure. FIGS. 4A and 4B illustrate a plurality of laser emission schemes used in a multi-pulse ranging operation. FIG. 5 illustrates a flow chart of an exemplary method 500 for controlling the scanning scheme of laser beam 209 to limit its power based on the predetermined tolerance value, according to some embodiments. For ease of illustration method 500 is described with FIGS. 3A-3D and 4A-4B, and the adjustment of laser emission scheme 352 is used as an example to describe method 500.

At step 502, an object is detected based on a returned laser signal. Referring to FIG. 3A, the control/adjustment of laser emission scheme for an object 212-1 at location 302 is described for illustrative purposes. Returned laser signal 211 may be formed by the reflection of laser beam 209 from object 212-1. Controller 252 may receive respective receiver signal (e.g., 218) of returned laser signal 211 and determine the existence of object 212-1 based on the receiver signal. In some embodiments, the intensity of the receiver signal from an object (e.g., object 212-1) is different from the intensity of receiver signals when no object is detected. For example, the intensity of the receiver signal may be zero or a flat noise value when no object is detected, and the intensity of the receiver signal formed by the reflection of laser beam 209 from object 212-1 may be a value significantly different from (e.g., greater than) zero/noise value.

As shown in FIG. 3A, controller 252 may control transmitter 202 to scan laser beam 209 along various directions/angles within FOV 300 of LiDAR system 102. In some embodiments, transmitter 202 (e.g., via scanner 210) may scan laser beam 209 along a lateral scanning direction (e.g., the x-direction) and a vertical scanning direction (e.g., the y-direction). In an example, the scanning angle of laser beam 209 may include a vertical scanning angle and a lateral scanning angle. The vertical scanning angle may represent the direction of laser beam 209 with respect to the vertical direction (e.g., the y-direction), and the lateral scanning angle may represent the direction of laser beam 209 with respect to a lateral direction (e.g., the x-direction). At a fixed lateral scanning angle, transmitter 202 may incrementally change the vertical scanning angle of laser beam 209 by a vertical delta angle so one laser beam 209 and an immediately-subsequent laser beam 209 may be separated from each other by the vertical delta angle. The vertical delta angle may be any suitable value such as 0.01°, 0.02°, 0.05°, 0.1°, 0.2°, 0.5°, 1°, and the like. In some embodiments, transmitter 202 scans laser beam 209 from top to bottom in the 3D space at each lateral scanning angle. After scanning laser beam 209 at one lateral scanning angle, transmitter 202 may scan laser beam 209 from top to bottom in the 3D space at another lateral scanning angle, which may form a lateral delta angle with the previous lateral scanning angle. The lateral delta angle may be any suitable value such as 0.01°, 0.02°, 0.05°, 0.1°, 0.2°, 0.5°, 1°, and the like.

In some embodiments, transmitter 202 repeatedly scans laser beam 209 vertically and laterally to cover FOV 300. Laser beam 209 may be emitted along its respective scanning direction within FOV 300 at the time it is being scanned. At any location in FOV 300, on a vertical plane facing laser beam 209, the scanning pattern of laser beams 209 may form a plurality of scanning points, each scanning point corresponding to laser beam 209 scanned or to be scanned at a given time. In other words, the laser beams 209 emitted or to be emitted along a plurality angles may project to the vertical plane to form the plurality of projections, forming the plurality of scanning points. In some embodiments, at a desired scanning rate, transmitter 202 may scan laser beam 209 a plurality of times (e.g., at different vertical scanning angles) at one lateral scanning angle before moving to the next lateral scanning angle. In some embodiments, transmitter 202 may scan laser beam 209 a plurality of times (e.g., at different lateral scanning angles) at one vertical scanning angle before moving to the next vertical scanning angle. In some embodiments, the lateral scanning angle, the vertical scanning angle, the lateral delta angles, the vertical delta angles, the scanning rate, and/or divergence characteristics of laser beam 209 may be used to determine the spatial/geometric distribution of laser beam 209 in the 3D space and the distribution of scanning points at any suitable surface/location.

When object 212-1 enters FOV 300 of LiDAR system 102, laser beam 209 may be incident on object 212-1 as transmitter 202 scans laser beam 209 vertically and laterally. Laser beam 209 may be reflected, forming returned laser beam 211 from object 212-1. Returned laser beam 211 may then be detected by photodetector 216 and converted to the respective receiver signal, which is further transmitted to controller 252 for processing. Details of the laser emission scheme by transmitter 202 are illustrated in FIGS. 3A-3D.

As shown in FIGS. 3A-3D, transmitter 202 may sequentially scan laser beam 209 along the vertical scanning direction and along the lateral scanning direction. On a surface facing transmitter 202 at each location (e.g., 302 or 304), laser beam 209 may sequentially form a plurality of (e.g., an array of) scanning points 310 when it is scanned sequentially onto the surface. For ease of description, each scanning point 310 is referred to as being corresponding to a laser beam 209. For example, as shown in FIG. 3B, scanning point 310-2 (in dark gray shade) may correspond to laser beam 209 incident on object 212-1. Returned laser beam 211 of laser beam 209 corresponding to scanning point 310-2 may be detected for determining the existence of object 212-1. Scanning points 310-4 (in medium gray shade) may correspond to laser beams 209 to be adjusted in response to the detection of object 212-1. Scanning points 310-0 (in light gray shade) may correspond to laser beam 209 not incident on any object and/or not adjusted in response to the detection of an object.

Referring to FIG. 5, at step 504, a distance between the detected object and the LiDAR system is determined. Referring back to FIGS. 2B and 3A, controller 252 (e.g., using object detecting unit 238) may determine a distance D1 between object 212-1 and LiDAR system 102. Controller 252 may determine D1 based on the round-trip travel time of laser beam 209 and returned laser beam 211, as well as the speed of light. In some embodiments, controller 252 may also incorporate the scanning angle of laser beam 209 in the calculation that determines D1.

In some embodiments, after controller 252 (e.g., using object detecting unit 238) determines distance D1 is equal to or less than the distance tolerance value, controller 252 (e.g., using transmitter adjusting module 250) may determine the value indicating the total power to be incident on an aperture at distance D1. Based on the value, controller 252 may adjust the laser emission scheme accordingly. In some embodiments, object detecting unit 238 transmits an alert signal and/or the detected distance (e.g., D1) to transmitter adjusting module 250 when the detected distance is less than or equal to a safety distance value. The distance tolerance value may represent a safety distance beyond which laser beam 209 would likely not cause harm to human eyes. In some embodiments, controller 252 determines the distance tolerance value by incorporating the scanning parameters of laser beam 209 such as scanning angles, vertical delta angles, lateral delta angles, scanning rate, divergence characteristics, and/or power of laser beam 209, in combination with the safety limit of laser power. Controller 252 may then determine little or no harm can be caused to human eyes when object 212 is beyond the distance tolerance value. No alert signal is thus generated, thus no adjustment to laser emission scheme is performed. When controller 252 determines distance D1 is equal to or less than the distance tolerance value, an alert signal and/or the detected distance may be transmitted from object detecting unit 238 to transmitter adjust module 250, so transmitter adjusting module 250 may perform suitable calculation to determine the adjustment to the laser emission scheme applied to subsequent laser emissions.

At step 506, a value indicating the total laser power to be incident on an aperture at the distance is determined. In some embodiments, the value may include the total laser power value. Referring to FIGS. 3B and 3C, controller 252 may determine the total power to be incident on an aperture A of a desired diameter d0 on the surface at the distance D1 (e.g., at location 302 in FIG. 3A). In various embodiments, diameter d0 of aperture A can be determined based on, e.g., the size/dimensions of an area on object 212 that need to be protected from potential harm caused by laser beam 209. In some embodiments, dimensions of aperture A are similar to the dimensions of a human pupil so that the total power to be incident in aperture A can represent the total power that can be incident on a human pupil. The control/adjustment of power can thus more precisely prevent the total power incident on aperture A (or a human pupil) from exceeding the predetermined tolerance value, ensuring the safety of human eyes. In some embodiments, diameter d0 of aperture A is about 7 mm.

Controller 252 may determine the total power to be incident on aperture A by employing suitable parameters such as scanning angles, vertical delta angles, lateral delta angles, scanning rate, divergence characteristics, power of a single laser beam 209, and/or distance D1. In some embodiments, controller 252 determines the number of scanning points 310 covered by aperture A for the determination of the total power. For example, as shown in FIG. 3B, controller 252 may determine scanning point 310-2 to be the first scanning point covered by aperture A, and determine one or more scanning points 310-4 along the lateral and vertical scanning directions and overlapped (e.g., partially or fully) with aperture A to be covered by aperture A. Controller 252 may thus determine the distribution of scanning points 310 at distance D1 based on one or more of the parameters to determine the number of scanning points 310 covered by aperture A. Controller 252 may then determine the total power to be incident on aperture A to be the sum of power emitted by the laser beams 209 corresponding to scanning points 310-2 and 310-4.

Controller 252 may also determine other values indicative of or correlated with the total power to be incident on aperture A. These values may be used as alternatives of or supplements to the total power to be incident on aperture A, for the adjustment of laser emission scheme. These values may be correlated to and/or vary as functions of distance D1, and may reflect the total power to be incident on aperture A at distance D1.

In some embodiments, controller 252 determines the density of scanning points at the distance as a value indicative of the total power to be incident on aperture A. For example, controller 252 may calculate the density of scanning points 310 at distance A based on parameters such as the scanning angles, vertical delta angles, lateral delta angles, and/or laser beam divergence characteristics. The density of scanning points 310 may be defined as the number of scanning points 310 in a unit area at a particular distance between object 212 and LiDAR system 102. In some embodiments, the density of scanning points 310 is inversely proportional to the distance (e.g., D1) between the object (e.g., 212-1) and LiDAR system 102.

In some embodiments, controller 252 determines the size (e.g., spot size or diameter d1) of scanning point 310 at the distance as a value indicative of the total power to be incident on aperture A. For example, controller 252 may calculate the size of scanning point 310 at distance D1 based on parameters such as the scanning angles, vertical delta angles, lateral delta angles, and/or laser beam divergence characteristics. In some embodiments, the size of scanning points 310 is proportional to the distance (e.g., D1) between the object (e.g., 212-1) and LiDAR system 102.

At step 508, the value indicating the total laser power to be incident on aperture A at the distance is compared with a predetermined tolerance value. In some embodiments, controller 252 (e.g., using transmitter adjusting module 250) compares the total power and/or the one or more values indicative of the total power determined in step 506 with a respective tolerance value. For example, the predetermined tolerance value may include one or more tolerance values each corresponding to a type of quantity.

In some embodiments, the predetermined tolerance value includes one or more of a predetermined power tolerance value, a predetermined density tolerance value, and a predetermined size value of scanning points 310, each representing a safety limit of the respective value. In some embodiments, the predetermined power tolerance value includes the maximum laser power that can be incident on aperture A at the distance (e.g., D1). Laser power higher than the predetermined power tolerance value may cause harm to human eyes by laser beam 209. In some embodiments, the predetermined density tolerance value includes the maximum density of scanning points 310 at the distance (e.g., D1). Density of scanning points 310 higher than the predetermined density tolerance value may cause harm to human eyes by laser beam 209. In some embodiments, the predetermined size value includes the minimum size (e.g., diameter) of scanning points 310 at the distance (e.g., D1). Size of scanning point 310 less than the predetermined size tolerance may cause harm to human eyes by laser beam 209.

Controller 252 may compare, at distance D1, one or more of the total laser power to be incident on aperture A, the density of scanning points 310, and/or the size of scanning point 310 with the respective predetermined tolerance value, at step 508. In step 510, controller 252 may determine whether the comparison result indicates the safety limit preventing human eyes from being harmed by subsequent laser beams 209 will be exceeded. For example, at distance D1, if the total laser power is higher than the predetermined power tolerance value, the density of scanning points is higher than the predetermined density tolerance value, and/or the size of scanning point 310 is less than the predetermined size value, controller 252 may determine that the safety limit will be exceeded if no adjustment is made to subsequent laser emission scheme. Accordingly, method 500 proceeds to step 512 along the YES branch following step 510, in which controller 252 may adjust the laser emission scheme so that the total laser power to be incident on aperture A by subsequent laser emissions is not higher than the predetermined power tolerance value.

At step 512, the laser emission scheme may be adjusted to reduce the total power to be incident on aperture A so that the total laser power and/or the values indicative of the total power are each less than or equal to the respective predetermined tolerance values. Referring to FIG. 3B, the laser emission scheme of LiDAR system 102 may be adjusted so the total laser power emitted by laser beams 209 corresponding to scanning points 310-2 and 310-4 is not greater than the predetermined power tolerance value. The adjustment of laser emission scheme is explained using the adjustment of total laser power as an example. The adjustment of laser emission scheme using the adjustment of other values indicative of the total laser power may be similar and details are omitted herein.

The total power to be incident on aperture A may be adjusted in various ways through adjusting laser emission schemes. The laser emission scheme may be determined at least partially based on the difference between laser power of laser beam 209 at one scanning point (e.g., 310-2) and the predetermined tolerance value. For example, if the power of laser beam 209 (e.g., corresponding to scanning point 310-2) is sufficiently high, controller 252 may adjust the laser emission scheme by skipping a sufficient number of scanning points 310 (e.g., all of scanning points 310-4) to ensure the total power to be incident on aperture A does not exceed the predetermined power tolerance value. In some embodiments, if the difference between the power of laser beam 209 (e.g., corresponding to scanning point 310-2) and the predetermined power tolerance value is sufficiently large, transmitter 202 may scan laser beam 209 at one or more scanning points 310-4 with full power or reduced power. In other words, depending on the difference between laser power of laser beam 209 and the predetermined tolerance value, controller 252 may adjust the laser emission scheme by reducing the power of laser beam 209 at one or more scanning points 310-4 covered by aperture A, skipping scanning of one or more scanning points 310-4 covered by aperture A, or a combination of the two operations. Controller 252 may determine the number of scanning points 310-4 to be skipped, the number of scanning points 310-4 corresponding to laser beam 209 with full and/or reduced power, or a combination of the two operations.

In some embodiments, as shown in FIG. 3B, along the vertical scanning direction and the lateral scanning direction, controller 252 may reduce the laser power of laser beams 209 corresponding to one or more scanning points 310-4 so that the total power emitted by laser beams 209 corresponding to scanning points 310-2 and 310-4 is not greater than the predetermined power tolerance value. In some embodiments, controller 252 reduces the laser power of laser beams 209 corresponding to all scanning points 310-4 (e.g., eight scanning points 310-4) covered by aperture A. The laser power of laser beams 209 corresponding to scanning points 310-4, after the adjustment/reduction, may be the same as or different from one another. In some embodiments, controller 252 may skip scanning (e.g., not scanning laser beam 209 or emitting no laser power) of one or more of scanning points 310-4. In some embodiment, controller 252 may skip the scanning of laser beams 209 corresponding to all scanning points 310-4 (e.g., eight scanning points 310-4) covered by aperture A.

In some embodiments, power of laser beam 209 may not be adjustable or may not be adjusted, and controller 252 may skip scanning of one or more scanning points 310-4 so that the total power incident on aperture A does not exceed the predetermined tolerance value. In some embodiments, the power of laser beam 209 is sufficiently high (e.g., higher than at least one half of the predetermined power tolerance value such that more than one laser beam emitted into aperture A would exceed the safety limit) and controller 252 skips scanning of all scanning points 310-4 so that the total power incident on aperture A does not exceed the predetermined tolerance value.

In various embodiments, scanning point 310-2 can be located at any place within aperture A. The location of scanning point 310-2 in aperture A is not limited to the upper left corner of aperture A, as shown in FIG. 3B. The goal of the laser emission scheme is to ensure that the total power of scanning points falling within any aperture A (e.g., placed at any place against the scanning point pattern) is less than the predetermined power value. To that end, controller 252 may determine any suitable distribution of scanning point 310-2 and scanning points 310-4 to meet that goal.

In some embodiments, the distance tolerance value represents the minimum distance between the object (e.g., 212-1) and LiDAR system 102. In other words, the power of laser beam 209 is sufficiently high (e.g., sufficiently close to the predetermined power tolerance value) that the total power to be incident on aperture A can only include the laser power at scanning point 310-2. Controller 252 may thus skip scanning of laser beam 209 at all other scanning points (e.g., 8 scanning points 310-2) when the distance between the object (e.g., 212-1) and LiDAR system 102 is determined. In some embodiments, the distance tolerance value is determined based on the predetermined power tolerance value, the predetermined density tolerance value, and/or the predetermined size tolerance value.

FIG. 3C illustrates another laser emission scheme 354 at location 304, according to embodiments of the present disclosure. As an example, distance D2 between object 212-2 at location 304 and LiDAR system 102 is greater than distance D1 between location 302 and LiDAR system 102. A greater distance (e.g., D2) can result in a different distribution of scanning points 310 in the 3D space. For example, the size (e.g., diameter d2) of scanning point 310 at distance D2 may be greater than the size of scanning point 310 at distance D1 and the density of scanning points 310 at distance D2 may be less than the density of scanning point 310 at distance D1.

Because D2 is greater than D1, the number of scanning points 310 covered by aperture A at distance D2 is less than the number of scanning points 310 covered by aperture A at distance D1. As an example shown in FIG. 3C, four scanning points 310-2 and 310-4 are shown to be within aperture A. Controller 252 may adjust the laser emission scheme for scanning laser beam 209 at distance D2 using similar or the same operations as the operations for distance D1. Detailed description of the operations of controller 252 may be referred to the description of FIGS. 3A and 3B, and is not repeated herein.

As an example, transmitter 202 may scan laser beam 209 from left to right in FOV 300 so object 212-2 is detected later than object 212-1. When both objects 212-1 and 212-2 are present, controller 252 may adjust the laser emission scheme according to the object that is more likely to be harmed by laser beams 209. For example, in the case shown in FIG. 3B, controller 252 may determine that skipping eight scanning points for every powered scanning point will comply with the safety requirement, while in the case shown in FIG. 3C, skipping three scanning points for every powered scanning point will suffice. Because the requirement imposed on the case shown in FIG. 3B is more stringent, controller 252 may use the laser emission scheme determined based on the case shown in FIG. 3B for all subsequent laser emissions. Alternatively, controller 252 may dynamically adjust the laser emission scheme according to specific objects. For example, controller 252 may adopt one laser emission scheme for a set of scanning angles corresponding to object 212-1, and adopt another laser emission scheme for another set of scanning angles corresponding to object 212-2.

In some embodiments, the distance between object 212 and LiDAR system 102 changes over time, and controller 252 dynamically adjusts the laser emission scheme to ensure the total power incident on the aperture (e.g., aperture A) does not exceed the predetermined power tolerance value. For example, within the distance tolerance value, if object 212 moves from one location (e.g., 302) to another location (e.g., 304), controller 252 may dynamically adjust the laser emission scheme each time a new distance between object 212 and LiDAR system 102 is determined. If it is detected that the distance between object 212 and LiDAR system 102 is equal to or greater than the distance tolerance value, controller 252 may stop adjusting laser emission scheme and resume the laser emission scheme before the adjustment, e.g., scanning laser beam 209 at each scanning point 310.

Referring to FIG. 5, when the comparison result in step 510 indicates that a safety limit is not exceeded, method 500 proceeds to step 514 along the NO branch. In step 514, controller 252 may maintain a current laser emission scheme without making adjustment.

FIG. 3D illustrates an expanded version of laser emission scheme 352 shown in FIG. 3B, according to embodiments of the present disclosure. FIG. 3D shows a sequence of scanning points leading to the detection of an object and adjusted laser emission scheme for subsequent laser emissions.

As shown in FIG. 3D, transmitter 202 may scan laser beam 209 along the vertical scanning direction and, after scanning a column in the vertical direction, move one step along the lateral scanning direction and start scanning the next column. In one example, transmitter 202 may scan all scanning points 310-0 within the dashed-line box 310-1 (e.g., the previous laser emission scheme) before reaching scanning point 310-2, at which point an object (e.g., object 212-1) is detected. Controller 252 may, based on the distance between the object and LiDAR system 102, determine that adjustment to the previous laser emission scheme is needed. The adjusted laser emission scheme skips all eight scanning points within aperture A1. The next scanning point corresponding to a to-be-emitted laser beam (a powered scanning point) is scanning point 310-6, which is the first scanning point falling within an adjacent aperture A2, whereas all other scanning points within A2 are to be skipped. The powered and skipped scanning points in the subsequent sequence can be similarly determined, such as powered scanning point 310-10 and skipped scanning points 310-12 within a next aperture A3, as well as other similar combinations shown in FIG. 3D. In this way, no matter where the aperture is placed, it is guaranteed that no more than two powered scanning points fall within a single aperture, thereby limiting the total power to be lower than the safety limit.

It is noted that the scanning sequence can be different from the vertical-then-lateral matter shown in FIG. 4D. Controller 252 can make adjustment to the laser emission scheme in a similar manner to ensure that the total power within an arbitrarily placed aperture is not higher than the safety limit.

FIGS. 4A and 4B illustrate a plurality of laser emission schemes for a multi-pulse ranging operation, according to embodiments of the present disclosure. FIG. 4B is a continuation of FIG. 4A. In some embodiments, in the multi-pulse ranging operation, laser beam 209 corresponding to a single scanning point 310 may include a sequence of laser pulses 402. Each laser pulse 402 may have a power intensity/amplitude of P0. The number of laser pulses 402 may be greater than 1. Controller 252 may adjust the laser emission scheme for laser beam 209 corresponding to any scanning point 310 covered by a respective aperture. The laser emission scheme of laser beam 209 before adjustment is illustrated as "before scheme adjustment", in which a plurality of pulses 402 is in a sequence S. The laser emission schemes of laser beam 209 after adjustment is illustrated as "scheme adjustment 1-7".

As shown in FIGS. 4A and 4B, to adjust (e.g., reduce) the power of laser beam 209, controller 252 may reduce the number of pulses 402 in sequence S ("scheme adjustment 1"), reduce the power of a portion of pulses 402 to form one or more pulses 404 with a power intensity/amplitude of P1 ("scheme adjustment 2", P1<P0), or reduce the power of all pulses 404 to power intensity/amplitude of P1 ("scheme adjustment 3"). In some embodiments, the reduced power intensity/amplitude of multiple pulses 404 may be different (e.g., not necessarily equal to P1). Controller 252 may also reduce both the number of pulses and the power of each pulse in sequence S ("scheme adjustment 4"), reduce the number of pulses and the power of some (but not all) of the remaining pulse(s) in sequence S ("scheme adjustment 5"). Controller 252 may also control to emit only one pulse 402 in sequence S ("scheme adjustment 6") or emit only one pulse with reduced power 404 in sequence S ("scheme adjustment 7"). It should be noted that, the laser emission schemes shown in FIGS. 4A and 4B are merely examples to shown different combinations of pulses 402 and 404 in sequence S, and are not meant to limit the order of pulse 402/404 and/or values of P0/P1. For example, in a single sequence S, pulses 402 and 404 may also be emitted in other orders/timing. Power amplitude/intensity P1 of each pulse 404 may be the same as each other or different from one another in the same sequence S or different sequences.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

The invention claimed is:

1. A system for controlling power of laser lights emitted by an optical sensing device, the system comprising:
a scanner configured to direct a plurality of laser beams toward a field of view (FOV) of the optical sensing device according to a scanning pattern comprising an array of scanning points, each scanning point corresponding to a scanning direction along which a respective laser beam is to be directed by the scanner;
at least one storage device configured to store instructions; and
at least one processor communicatively coupled to the at least one storage device and the scanner and configured to execute the instructions to perform operations, the operations comprising:
controlling the scanner to direct one or more laser beams toward the FOV;
detecting an object within the FOV based on a reflected laser signal received by the optical sensing device;
determining a distance of the object from the optical sensing device;
determining a value indicating a total power of one or more subsequent laser beams to be directed by the scanner toward an aperture at the distance according to the scanning pattern, wherein the value comprises a quantity of scanning points covered by the aperture at the distance;
comparing the value with a predetermined tolerance value; and
adjusting a laser emission scheme to reduce the total power when the value is greater than the predetermined tolerance value, comprising:
determining a number of scanning points to be skipped based on the distance; and
skipping the determined number of scanning points in subsequent laser emissions, wherein no laser power is emitted along the scanning directions corresponding to the skipped scanning points.

2. The system of claim 1, wherein the aperture has a size of a human pupil.

3. The system of claim 1, wherein determining the value indicating the total power of the one or more subsequent laser beams to be directed by the scanner toward the aperture at the distance according to the scanning pattern comprises:
determining a density of scanning points at the distance.

4. The system of claim 1, wherein determining the value indicating the total power of the one or more subsequent laser beams to be directed by the scanner toward the aperture at the distance according to the scanning pattern comprises:
determining a size of a scanning point at the distance.

5. The system of claim 1, wherein adjusting the laser emission scheme comprises skipping at least one laser beam to be incident on the aperture at the distance, wherein no laser power is emitted corresponding to the skipped at least one laser beam.

6. The system of claim 5, wherein the operations comprises:
determining a number of laser beams to be skipped based on the distance; and
skipping the determined number of laser beams in subsequent laser emissions.

7. The system of claim 1, wherein adjusting the laser emission scheme comprises reducing power of at least one laser beam to be incident on the aperture at the distance.

8. The system of claim 7, wherein:
the at least one laser beam comprises a sequence of laser pulses.

9. The system of claim 8, wherein reducing the power of the at least one laser beam comprises skipping one or more laser pulses in the sequence, wherein no laser power is emitted corresponding to the skipped one or more laser pulses.

10. The system of claim 8, wherein reducing the power of the at least one laser beam comprises reducing power of one or more laser pulses in the sequence.

11. A method for controlling power of laser lights emitted by an optical sensing device, the method comprising:
directing, by a scanner, one or more laser beams toward a field of view (FOV) of the optical sensing device according to a scanning pattern comprising an array of scanning points, each scanning point corresponding to a scanning direction along which a respective laser beam is to be directed by the scanner;

detecting an object within the FOV based on a reflected laser signal received by the optical sensing device;

determining a distance of the object from the optical sensing device;

determining a value indicating a total power of one or more subsequent laser beams to be directed by the scanner toward an aperture at the distance according to the scanning pattern, wherein the value comprises a quantity of scanning points covered by the aperture at the distance;

comparing the value with a predetermined tolerance value; and adjusting a laser emission scheme to reduce the total power when the value is greater than the predetermined tolerance value, comprising:

determining a number of scanning points to be skipped based on the distance; and skipping the determined number of scanning points in subsequent laser emissions, wherein no laser power is emitted along the scanning directions corresponding to the skipped scanning points.

12. The method of claim 11, wherein determining the value indicating the total power of the one or more subsequent laser beams to be directed by the scanner toward the aperture at the distance according to the scanning pattern comprises:

determining a density of scanning points at the distance; or determining a size of a scanning point at the distance.

13. The method of claim 11, wherein adjusting the laser emission scheme comprises skipping at least one laser beam to be incident on the aperture at the distance, wherein no laser power is emitted corresponding to the skipped at least one laser beam.

14. The method of claim 13, further comprising:

determining a number of laser beams to be skipped based on the distance; and skipping the determined number of laser beams in subsequent laser emissions.

15. The system of claim 11, wherein adjusting the laser emission scheme comprises reducing power of at least one laser beam to be incident on the aperture at the distance.

16. The method of claim 11, wherein the at least one laser beam comprises a sequence of laser pulses and reducing the power of the at least one laser beam comprises skipping one or more laser pulses in the sequence, wherein no laser power is emitted corresponding to the skipped one or more laser pulses.

17. The method of claim 16, wherein reducing the power of the at least one laser beam comprises reducing power of one or more laser pulses in the sequence.

18. A non-transitory computer-readable medium having instructions stored thereon, wherein the instructions, when executed by at least one processor, cause the at least one processor to perform a method for controlling power of laser lights emitted by an optical sensing device, the method comprising:

controlling a scanner to direct one or more laser beams toward a field of view (FOV) of the optical sensing device according to a scanning pattern comprising an array of scanning points, each scanning point corresponding to a scanning direction along which a respective laser beam is to be directed by the scanner;

detecting an object within the FOV based on a reflected laser signal received by the optical sensing device;

determining a distance of the object from the optical sensing device;

determining a value indicating a total power of one or more subsequent laser beams to be directed by the scanner toward an aperture at the distance according to the scanning pattern, wherein the value comprises a quantity of scanning points covered by the aperture at the distance;

comparing the value with a predetermined tolerance value; and adjusting a laser emission scheme to reduce the total power when the value is greater than the predetermined tolerance value, comprising:

determining a number of scanning points to be skipped based on the distance; and skipping the determined number of scanning points in subsequent laser emissions, wherein no laser power is emitted along the scanning directions corresponding to the skipped scanning points.

19. The non-transitory computer-readable medium of claim 18, wherein determining the value indicating the total power of the one or more subsequent laser beams to be directed by the scanner toward the aperture at the distance according to the scanning pattern comprises:

determining a density of scanning points at the distance; or determining a size of a scanning point at the distance.

* * * * *